April 17, 1945.  A. R. PEER  2,374,124

GRADOMETER

Filed Dec. 1, 1941  2 Sheets-Sheet 1

Arthur Roscoe Peer INVENTOR.

BY
Victor J. Evans & Co.
ATTORNEYS

April 17, 1945. A. R. PEER 2,374,124
GRADOMETER
Filed Dec. 1, 1941 2 Sheets-Sheet 2

Arthur Roscoe Peer
INVENTOR.

BY
Victor J. Evans & Co.
ATTORNEYS

UNITED STATES PATENT OFFICE 2,374,124

GRADOMETER

Arthur Roscoe Peer, Berkeley Springs, W. Va.

Application December 1, 1941, Serial No. 421,226

3 Claims. (Cl. 33—69)

My invention relates to surveying instruments and has among its objects and advantages the provision of an improved gradometer to facilitate the determination of the ascent and descent of roads and the like.

Figure 1:
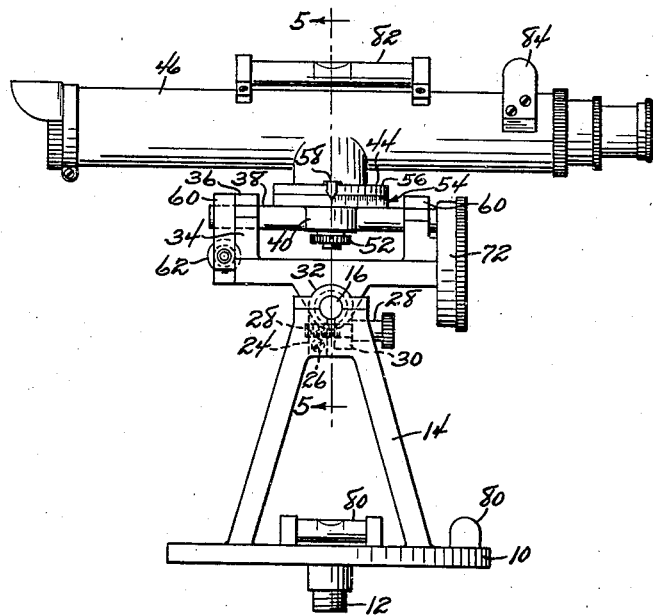
Figure 1 is a side elevational view of an instrument in accordance with my invention.
Figure 2:
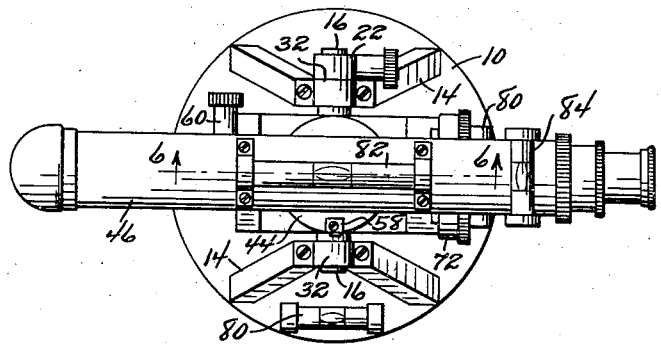
Figure 2 is a top plan view.
Figure 3:
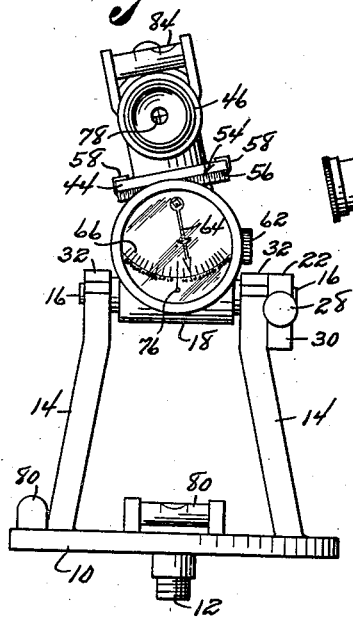
Figure 3 is an end view illustrating the instrument adjusted to an angle.
Figure 4:
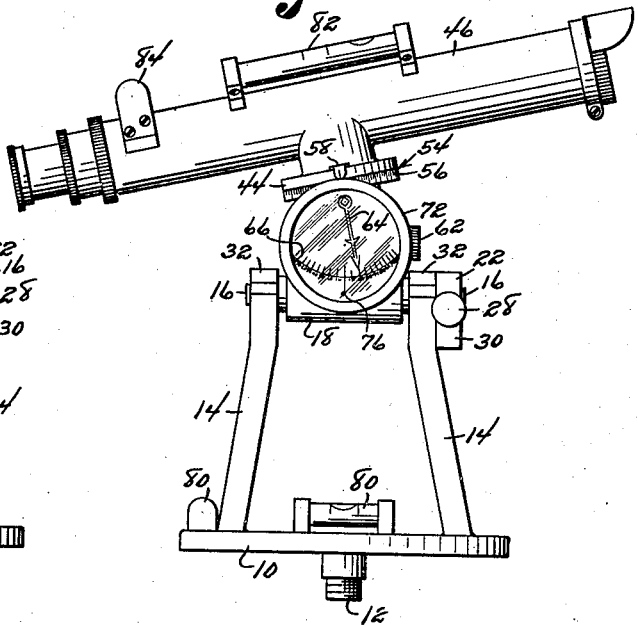
Figure 4 is a view similar to Figure 3 but illustrating the telescope of the instrument rotated ninety degrees from the position of Figure 3.
Figure 5:
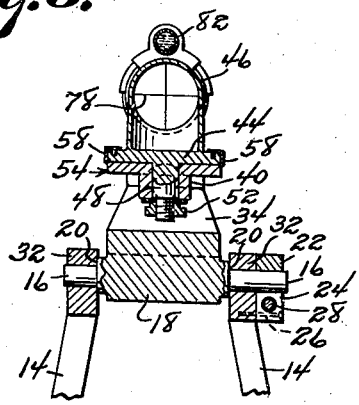
Figure 5 is a sectional view taken along the line 5—5 of Figure 1.
Figure 6:
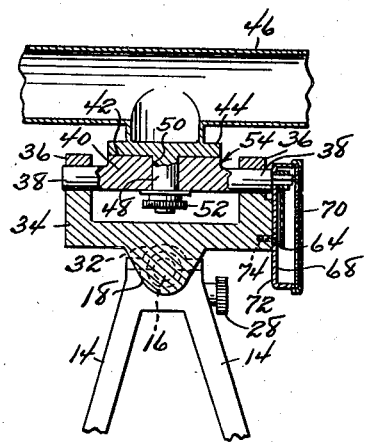
Figure 6 is a sectional view taken along the line 6—6 of Figure 2.

In the embodiment selected for illustration, I make use of a base plate 10 having a threaded member 12 for connection with the head of a tripod (not shown). Upon the plate 10 are mounted two supports 14 on which are rotatably mounted shafts 16 on a body 18 positioned between the supports. Body 18 engages the supports 14, as at 20, to restrain the shafts 16 from relative endwise movement. A split collar 22 is mounted on one of the shafts 16 with the arm 24 of the collar fixedly secured to the adjacent support 14 by a screw 26. A tightening screw 28 is threaded into the arm 24 and passes loosely through the arm 30 of the collar so that the shaft 16 passing through the collar may be frictionally clamped to prevent accidental rotation of the body 18. Bearings 32 are mounted on the supports 14 for supporting the respective shafts 16.

Body 18 includes two upstanding arms 34 provided with bearings 36 rotatably supporting shafts 38 on a body 40 provided with a flat face 42 constituting a rest for a disk 44 on a telescope 46. Disk 44 is provided with a pin 48 rotatably journaled in a bore 50 in the body 40, the bore 50 being arranged at right angles to the coaxial shafts 38. A nut 52 is threaded on the pin 48 to hold the disk 44 in connected relationship with the body 40. However, he disk 44 may be rotated about the axis of the pin 48, as when the telescope 46 is turned.

An annular face 54 is provided on the body 40 of the same diameter as the disk 44. A scale 56 is provided on the face 54 for coaction with pointers 58 secured at diametrically opposite points on the disk 44. Thus the degree of rotation of the telescope from one position to another may be determined by taking a reading on the scale 56 in connection with either pointer. Two pointers are provided so as to facilitate such reading from a position at either side of the instrument. A split collar 60 of the same type as the collar 22 is secured to one of the uprights 34, which collar clampingly engages one of the shafts 38 for securing the same against accidental turning. A tightening screw 62 corresponding to the tightening screw 28 is provided for the split collar 60.

To one of the shafts 38 is fixedly secured a needle 64 arranged to sweep across a dial 66 on a dial plate 68. A glass window 70 encloses the needle 64 in a housing 72 secured to one of the uprights 34 by screws 74. Dial 66 includes a zero position 76 with which the needle 64 registers when the telescope 46 is positioned with its horizontal hair line 78 in parallelism with the horizontal. Needle 64 may pivot to either side of the zero position 76 through pivoting of the telescope 46 and the body 40 as a unit about the axes of the shafts 38.

Spirit levers 80 are mounted on the plate 10, which levers are arranged in right angular relationship to enable the plate 10 to be adjusted to a true horizontal position in a universal direction. Spirit levels 82 and 84 are mounted on the telescope 46, the level 82 being arranged longitudinally of the telescope while the level 84 is arranged at right angles thereto, so that the telescope 46 may be set with its longitudinal axis in parallelism with the horizontal, in addition to providing a check for the needle 64 with respect to the zero position 76.

In operation, the instrument is set up at some point laterally of the road or other formation to be measured for grade. The instrument is set so that the axis of the telescope intersects the grade line horizontally. The point of intersection may lie intermediate the end limits of the grade. When so positioned, the telescope 46 is rotated about the axes of the shafts 38 to bring the horizontal hair line 78 in parallelism and registration with the grade line. Such rotation of the telescope pivots the needle 64 relatively to the dial 66 for indicating the rate of ascent or descent of the grade line. The dial 66 is calibrated to translate the angle in terms of rate of ascent or descent of the grade line, such as, for example, a ten percent grade (that is, of ten feet to one hundred).

The telescope may be rotated about the axis of the pin 48 to move the horizontal hair line 78 along the grade line. Such movement may be in either direction, depending upon whether the ascending or descending extent of the grade line is being measured. Variations in the rate of change of ascent or descent in different extents of the grade line are easily determined by merely maintaining the horizontal hair line 78 in registration with the respective extents of the grade line. The telescope 46 may be pivoted ninety degrees in either direction from its original setting. Thus the instrument is capable of measuring a relatively long grade line.

Without further elaboration, the foregoing will so fully illustrate my invention, that others may, by applying current knowledge, readily adapt the same for use under various conditions of service.

I claim:

1. A gradometer comprising a support having two spaced and upright members, a body having shaft means mounted on said members for rotation about a first horizontal axis, said body having spaced and upstanding arms, a second body having second shaft means mounted on said arms for rotation about a second horizontal axis at right angles to said first horizontal axis, said second body having an opening arranged with its axis at right angles to and intersecting said first and second horizontal axes, said second body having a first flat face lying at right angles to the axis of said opening, a telescope having a body fixed thereto provided with a second flat face lying on said first flat face for supporting the telescope with its axis paralleling said first and second flat faces, a pin fixed to the body on said telescope rotatably supported in said opening, and means threaded on said pin and engaging said second body to restrain the telescope from accidental rotation.

2. The invention described in claim 1 wherein a split collar is mounted on a part of said first mentioned shaft means and fixedly related to one of said upright members, and threaded means for clamping the collar to said part of said shaft means to restrain the first mentioned body from accidental rotation about said first horizontal axis.

3. The invention described in claim 1 wherein one of said arms is provided with a fixed scale, and a pointer fixedly related to a part of said second shaft means for coaction with said scale to indicate the degree of rotation of the telescope about said second horizontal axis.

ARTHUR ROSCOE PEER.